(12) United States Patent
Gauta

(10) Patent No.: US 12,626,304 B1
(45) Date of Patent: May 12, 2026

(54) METHODS AND SYSTEMS FOR GENERATING A FINANCIAL PLAN AND STREAMLINING CLIENT ONBOARDING

(71) Applicant: Spencer Jake Gauta, Tampa, FL (US)

(72) Inventor: Spencer Jake Gauta, Tampa, FL (US)

( * ) Notice: Subject to any disclaimer, the term of this patent is extended or adjusted under 35 U.S.C. 154(b) by 0 days.

(21) Appl. No.: 18/789,321

(22) Filed: Jul. 30, 2024

Related U.S. Application Data

(60) Provisional application No. 63/532,631, filed on Aug. 14, 2023.

(51) Int. Cl.
*G06Q 40/06* (2012.01)

(52) U.S. Cl.
CPC ........... *G06Q 40/066* (2025.08); *G06Q 40/06* (2013.01)

(58) Field of Classification Search
CPC .............................. G06Q 40/06; G06Q 40/066
See application file for complete search history.

(56) References Cited

U.S. PATENT DOCUMENTS

| | | | |
|---|---|---|---|
| 11,444,893 B1* | 9/2022 | Kalluri | G10L 15/22 |
| 2010/0306126 A1* | 12/2010 | Moran | G06Q 40/06 |
| | | | 705/36 R |
| 2013/0226706 A1* | 8/2013 | Haggerty | G06Q 40/02 |
| | | | 705/14.66 |

* cited by examiner

*Primary Examiner* — Scott C Anderson
(74) *Attorney, Agent, or Firm* — Derek Fahey, Esq.; The Plus IP Firm, PLLC

(57) ABSTRACT

A computer implemented method and system for using machine learning and artificial intelligence to generate a financial plan and streamline client onboarding is disclosed. The computer implemented method includes identifying first financial information from a recording of a first conversation between a first, a second and a third computing device, querying in a connected database, a preprogrammed financial plan algorithm for generating a provisional financial plan, determining missing financial information not in the financial information, sending, a message to the third computing device requesting the missing information. Further, the computer implemented method includes receiving a second message over the communications network from the third computing device and generating a financial plan based on the second financial information as the provisional financial plan, and editing the financial plan based on a third financial information and a fourth financial information to generate an updated financial plan.

10 Claims, 8 Drawing Sheets

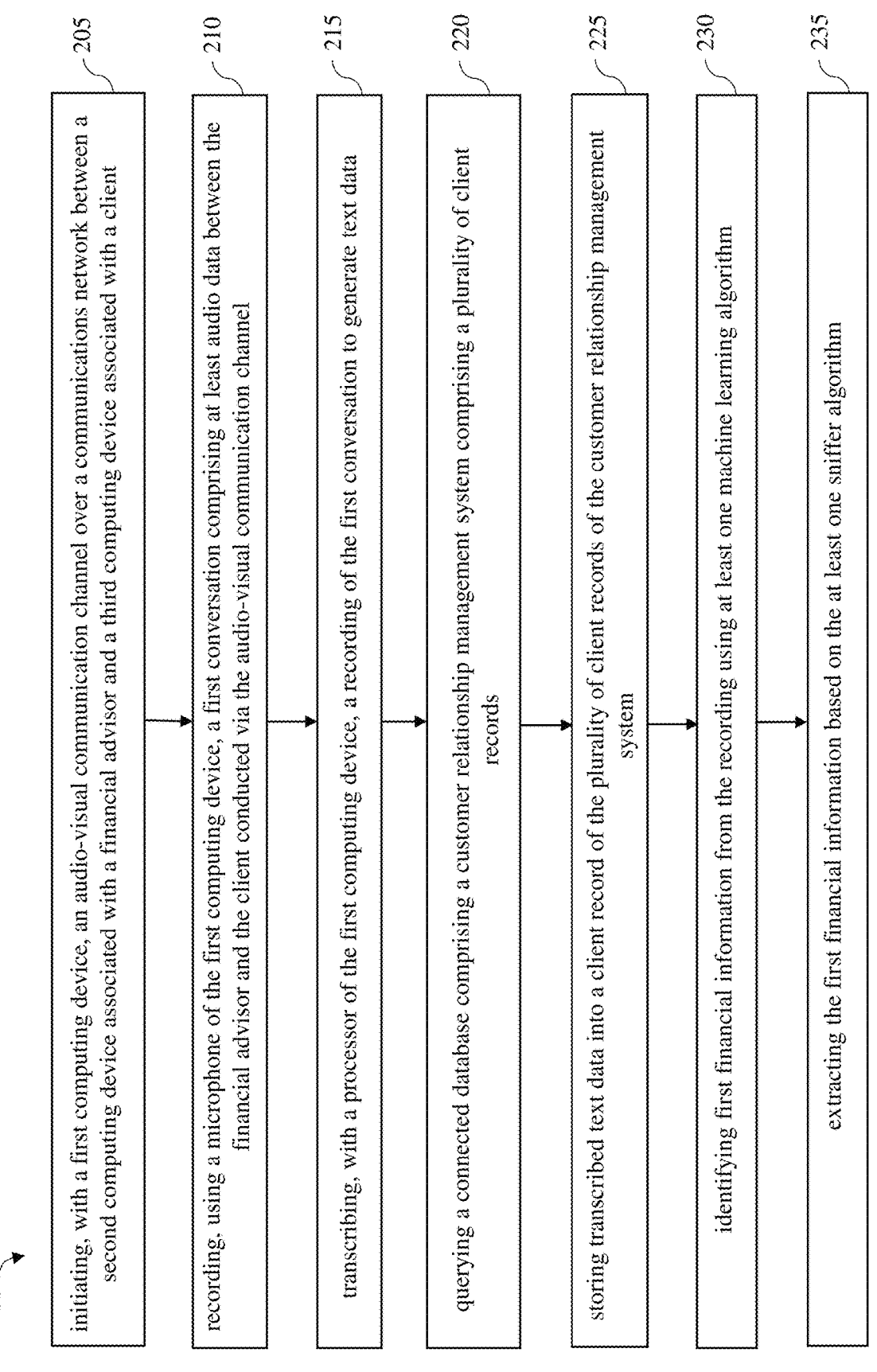

200 initiating, with a first computing device, an audio-visual communication channel over a communications network between a second computing device associated with a financial advisor and a third computing device associated with a client

205 recording, using a microphone of the first computing device, a first conversation comprising at least audio data between the financial advisor and the client conducted via the audio-visual communication channel

210 transcribing, with a processor of the first computing device, a recording of the first conversation to generate text data

215 querying a connected database comprising a customer relationship management system comprising a plurality of client records

220 storing transcribed text data into a client record of the plurality of client records of the customer relationship management system

225 identifying first financial information from the recording using at least one machine learning algorithm

230 extracting the first financial information based on the at least one sniffer algorithm

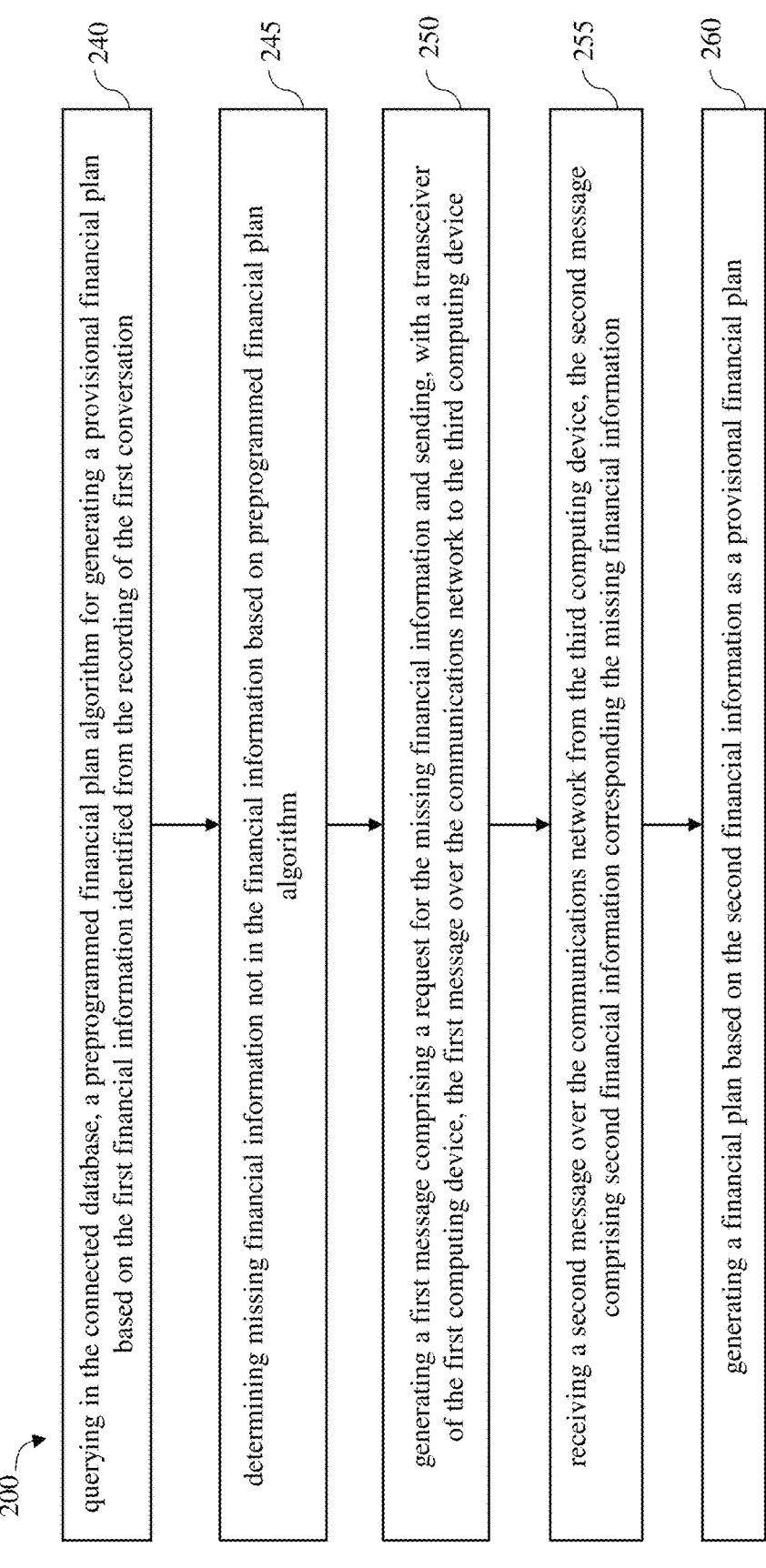

200 querying in the connected database, a preprogrammed financial plan algorithm for generating a provisional financial plan based on the first financial information identified from the recording of the first conversation

240 determining missing financial information not in the financial information based on preprogrammed financial plan algorithm

245 generating a first message comprising a request for the missing financial information and sending, with a transceiver of the first computing device, the first message over the communications network to the third computing device

250 receiving a second message over the communications network from the third computing device, the second message comprising second financial information corresponding the missing financial information

255 generating a financial plan based on the second financial information as a provisional financial plan

METHODS AND SYSTEMS FOR GENERATING A FINANCIAL PLAN AND STREAMLINING CLIENT ONBOARDING

REFERENCE TO RELATED APPLICATIONS

This application is a non-provisional application that claims the benefit of the filing date of U.S. Provisional Application Ser. No. 63/532,631 titled "Methods and Systems for Generating a Financial Plan and Streamlining Client Onboarding" and filed 14 Aug. 2023, and the subject matter of which is incorporated herein by reference.

TECHNICAL FIELD

The present invention relates to the field of financial plans, and more specifically to methods and systems for generating financial plans and onboarding clients.

BACKGROUND

A financial plan is a comprehensive evaluation of an individual's current financial situation, asset values, short-term and long-term economic goals, and a strategy to achieve the goals. The comprehensive evaluation includes analysis of the goals and a large set of data associated with an individual, such as, not limiting to, current income, tax liabilities, net worth, future retirement plan, asset allocation, and estate plans, expenses, liabilities, and other data. The short-term economic goals mainly include factors relating to current debt, a budget, and emergency funds, whereas the long-term economic goals consider objectives such as retirement, education for dependents or themselves, and major expenses, such as new car, wedding, etc.

To achieve the long-term and short-term economic goals, individuals generally work with a financial advisor. The financial advisor establishes a direct relationships with many clients for financial planning, and regularly consult with each of the clients to help clients achieve their financial goals.

The financial advisor considers multiple factors including variable factors, such as degrading economy, rise in interest rates, fall in equity prices, or sudden inflation that impacts assets and liabilities of the individual. Collecting and analyzing such a large set of data and considering the multiple factors to generate the financial plan is generally cumbersome and complex. The process of generating the financial plan is also time-consuming and prone to errors that may affect accuracy or reliability of the financial plan.

As a result, there exists a need for improvements over the prior art and more particularly for a more efficient way of generating a financial plan and onboarding a client.

SUMMARY

A system and a method for using machine learning and artificial intelligence to generate a financial plan and streamline client onboarding is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a computer implemented method using machine learning and artificial intelligence to generate a financial plan and streamline client onboarding is disclosed. The computer implemented method is initiating an audio-visual communication channel over a communications network between a second computing device associated with a financial advisor and a third computing device associated with a client. The audio-visual communication is initiated with a first computing device; recording, using a microphone of the first computing device, a first conversation comprising at least audio data between the financial advisor and the client conducted via the audio-visual communication channel; querying a connected database having a customer relationship management system that has a plurality of client records; identifying first financial information from a recording of the first conversation using a machine learning algorithm having a sniffer algorithm, the sniffer algorithm has one of (i) natural language processing algorithms, (ii) pattern recognition algorithms, and (iii) data classification algorithms to analyze data, extract, and capture predetermined relevant financial information; extracting the first financial information based on the sniffer algorithm; querying in the connected database, a preprogrammed financial plan algorithm for generating a provisional financial plan based on the first financial information identified from the recording of the first conversation; determining missing financial information not in the financial information based on preprogrammed financial plan algorithm; generating a first message having a request for the missing financial information and sending, with a transceiver of the first computing device, the first message over the communications network to the third computing device; receiving a second message over the communications network from the third computing device, the second message having second financial information corresponding the missing financial information; generating a financial plan based on the second financial information as the provisional financial plan; providing a conversational artificial intelligence assistant for engaging in at least one of (i) text based communications, and (ii) audio based communications with at least one of the financial advisor and the client; engaging in a second conversation between the conversational artificial intelligence assistant and at least one of the financial advisor and the client; extracting third financial information from the second conversation using the at least one sniffer algorithm; receiving a plurality of documents from at least one of the second computing device and the third computing device; analyzing the plurality of documents to extract fourth financial information using the at least one machine learning algorithm; and editing the financial plan based on the third financial information and the fourth financial information to generate an updated financial plan.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein:

FIG. 2A is a flowchart showing the control flow of the process for methods and systems for extracting financial information from a recorded conversation, according to an example embodiment;

FIG. 2B is a flowchart showing the control flow of the process for methods and systems for generating a provisional financial plan based on information received from a client, according to an example embodiment;

DETAILED DESCRIPTION

Figure 1:
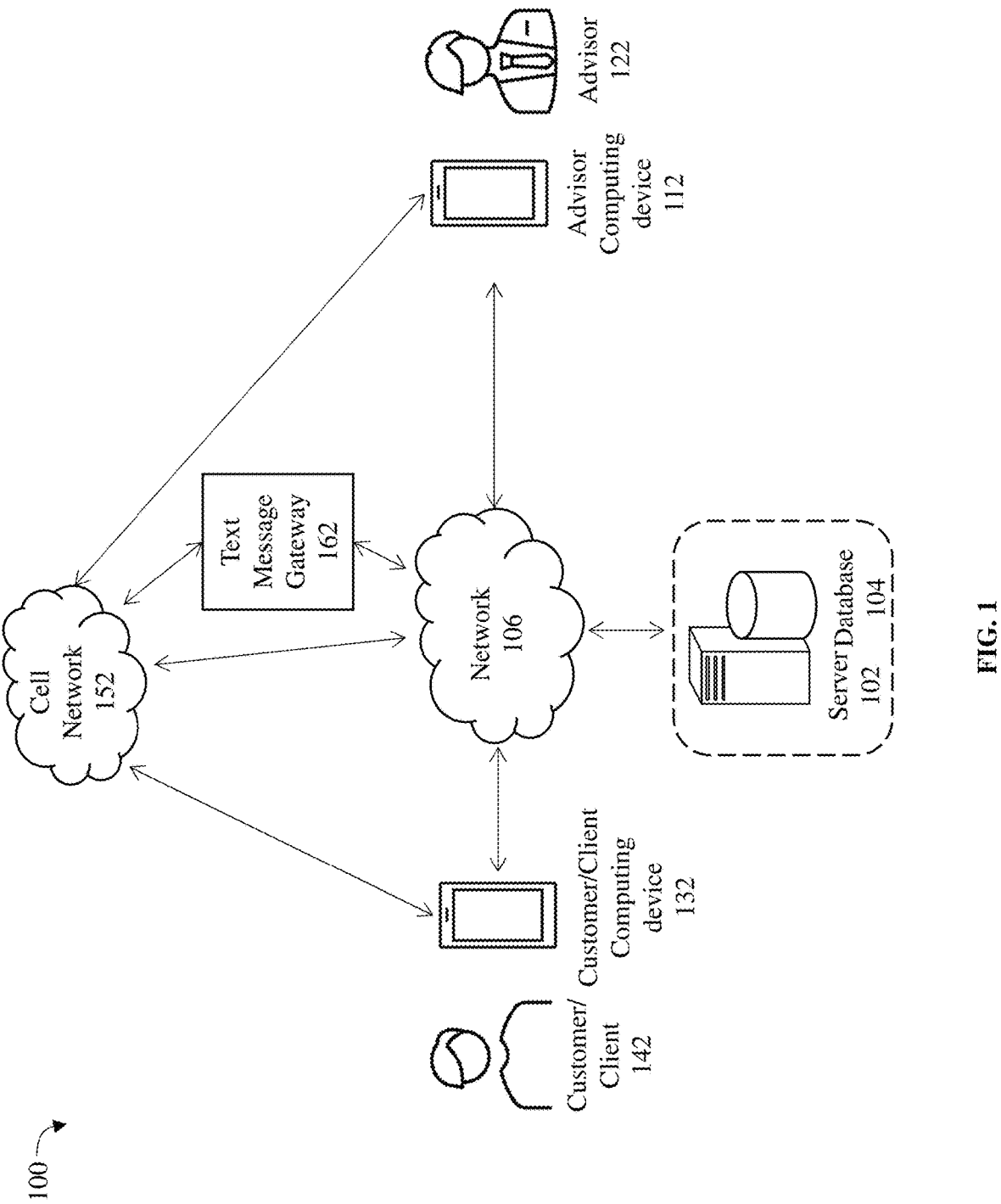
FIG. 1 is a diagram of an operating environment that supports applications, methods and systems for generating a financial plan and onboarding a client, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing systems and methods that use machine learning and artificial intelligence to generate a financial plan and streamline client onboarding. In one embodiment, the system also improves over the prior art by identifying and extracting financial information from a recording of a conversation between a client and a financial advisor. In one embodiment, the system also improves over the prior art by providing a simple and non-complicated means of generating a provisional financial plan for the client by querying in a connected database a preprogrammed financial plan algorithm, the connected database having a customer relationship management system comprising a plurality of client records. In one embodiment, the system improves over the prior art by determining missing financial information not in the financial information based on a preprogrammed financial plan algorithm and sending a message to a computing device associated with the client to request the missing financial information. In other embodiments, the system extracts financial information from a conversation between a conversational artificial intelligence assistant and one of the financial advisor and the client and from a plurality of documents received from the client and the financial advisor to edit the financial plan and generate an updated financial plan. In one embodiment, the system improves over the prior art by customizing the financial plan based on inputs received by the client on the client device. In another embodiment, the system improves over the prior art by automating the entire process of receiving financial information from the client and onboarding the client.

Referring now to the Figures, FIG. 1 is a diagram of an operating environment or system 100 that supports a system and method for using machine learning and artificial intelligence to generate a financial plan and streamline client onboarding with a first computing device 102, for example a server 102 over a communications network 106, according to an example embodiment. The environment 100 may comprise a second computing device, such as an advisor device 112 associated with a financial advisor 122, and a third computing device, such as a client device 132 associated with a client 142, all of which may communicate with the first computing device 102 via the communications network 106 and a cell network 152. The advisor device 112, and the client device 132 may comprise any computing devices, such as integrated circuits, printed circuit boards, processors, ASICs, PCBs, cellular telephones, smart phones, tablet computers, laptops, and game consoles, for example. The server 102, the advisor device 112, and the client device 132 may be connected wirelessly to the communications network 106 and the cell network 152. Further, the system 100 may comprise a text message gateway 162 implemented in between the cell network 152 and the communications network 106. The text message gateway 162 may provide protocol interworking for text messages between the cell network 152 and the communications network 106. The text message gateway 162 allows exchange of mobile generated text messages between the advisor device 112 and client device 132 and the server 102.

Communications network 106 may include one or more packet switched networks, such as the Internet, or any local area networks, wide area networks, enterprise private networks, cellular networks, phone networks, mobile communications networks, or any combination of the above. In one embodiment, the server 102, the advisor device 112, and the client device 132 are programmable logic controllers or PLC. Cell network 152 may include cellular networks, phone networks, mobile communications networks, or any combination of the above.

The server 102 includes a software engine that delivers applications, data, program code and other information to networked computing devices 112, 132. The software engine of the server 102 may perform other processes such as transferring multimedia data in a stream of packets that are interpreted and rendered by a software application as the packets arrive. FIG. 1 further shows that the server 102 is connected to a database or repository 104, which may be a relational database comprising a Structured Query Language (SQL) database stored in a SQL server or a database that adheres to the NoSQL paradigm. In one embodiment, the database 104 has a customer relationship management system comprising a plurality of client records. The advisor and client devices 112, 132, may also each include databases.

The database 104 may serve client record and data, as well as related information, used by the first computing device 102 during the course of operation of the invention. For example, the server 102 may include a data extracting element for identifying and extracting financial data from a recorded conversation or from client records stored in database 104 and providing the financial data, which includes data regarding investment, tax planning, income, and retirement planning of the client, for generating the financial plan. The data extraction element may comprise technology such as a wireless communication element, such as WIFI, Bluetooth, NFC etc. In one embodiment, the data provided by devices 112, and 132 is provided to the server 102 via TCP/IP and/or HTTP over the network 106.

Devices 112, 132 and server 102 may each include program logic comprising computer source code, scripting language code or interpreted language code that perform various functions of the present invention. In one embodiment, the aforementioned program logic may comprise program module 407 in FIG. 4. It should be noted that although FIG. 1 shows only devices 112, 132, and one server 102, the system of the present invention supports any number of computing devices, servers and client computing devices connected via network 106 and cell network 152. Also note that although server 102 is shown as a single and independent entity, in one embodiment, server 102 and its functionality can be realized in a centralized fashion in one computer system or in a distributed fashion wherein different elements are spread across several interconnected computer systems.

Various types of data may be stored in the database 104 of server 102. For example, the database may be the configured to store a customer relationship management system for storing client records and data related to financial information of each client or customer. As would be understood, a customer relationship management (CRM) system is a set of applications that stores, organizes and processes client information, services and interactions. In one embodiment, a client record may include a client name, age, email address, data regarding investments, tax, insurance of a client. Additionally, client data may include data regarding saving plans of the client, salary, expenses, account details and net worth of the client. The client records may also include relevant documents, such as bank statements, policy documents, salary slips, investment certificates, insurance certificates, loan documents, rent receipts, medical bills. The database may include a preprogrammed financial plan algorithm that generates a financial plan for a client based on financial data of the client.

Additionally, server 102 may have an internal database to store rules to define algorithms such as machine learning algorithm and sniffer algorithm. The sniffer algorithm may comprise one of natural language processing algorithms, pattern recognition algorithms, and data classification algorithms. The natural language processing algorithm may be used to process interaction between computers and humans in natural language and extract meaningful information from the interaction. The natural language processing algorithm use computational techniques to analyze natural language data, such as text and speech, and interprets the meaning behind the language. The pattern recognition algorithm may be used to recognize patterns and regularities in data. The data may be classified based on statistical information or knowledge gained from patterns and their representation. The data classification algorithms may be used to analyze data, extract, and capture predetermined relevant financial information for a client.

In an embodiment, the client device 132 and the advisor device 112 may communicate with each other via the cell network 152 for conducting an audio or video call or exchanging text messages. In an example, a conversational artificial intelligence assistant is provided to each of the advisor and client devices 112 and 132. The advisor and client devices 112, and 132 may engage in text communication or audio communication with each other.

FIGS. 2A-2D are flowcharts showing the control flow of the method 200 for using machine learning and artificial intelligence to generate a financial plan and streamline client onboarding, according to an example embodiment. As illustrated in step 205, the system initiates an audio-visual communication channel over a communications network between the second computing device associated with a financial advisor and a third computing device associated with a client. For example, the server 102, also referred to as a first computing device herein, initiates the audio-visual communication channel between the advisor device 112, referred to as the second computing device, and the client device 132, referred to as the third computing device, over the communication network 106. The advisor device 112 is associated with the financial advisor 122, and the client device 132 is associated with the client 142, as shown in FIG. 1. In step 210, the system records a first conversation having audio data between the financial advisor 122 and the client 142 conducted via the audio-visual communication channel using a microphone. The server 102 records the first conversation between the financial advisor 122 and the client 142 using a microphone of the server 102. In an example, the first conversation may be an audio communication such as a phone call between the client 142 and the financial advisor 122 or a video call between the client 142 and the financial advisor 122. In step 215, the system transcribes a recording of the first conversation to generate text data. A voice recording of the conversation between the client 142 and the advisor 122 over the phone call or the video call has an audio data that is converted into text by the processor of the server 102.

Next in step 220, the system queries a connected database that comprises a customer relationship management system having a plurality of client records. The client records may be related to financial information of the client 142. Next in step 225, the system stores the transcribed text data into a client record of the plurality of client records of the customer relationship management system. In this step the server 102, after transcribing the recording, stores the transcribed text data into a client record into the database 104. The stored transcribed text data may be later retrieved for analysis of the conversation between the client 142 and the financial advisor 122 and recommend related products or plans to the client 142 or other clients having similar requirements as the client 142. In another example, the stored transcribed text data may be used for training the algorithms, such as the natural language processing algorithms, the pattern recognition algorithms, and the data classification algorithms. In step 230, the system identifies the first financial information from the recording using a machine learning algorithm. Next in step 235, the system extracts the first financial information based on the sniffer algorithm. For example, the first financial information includes salary and investment details of the client 142 including cash compensation, tax deductions, employee stock ownership plans, and investments in real estate and stocks. However, it is understood that other types of financial information may also be used for the first financial information and are within the scope of the present invention.

FIG. 2B is a flowchart showing the control flow of a method for generating a provisional financial plan, according to an example embodiment. In step 240, the system queries a preprogrammed financial plan algorithm in the connected database for generating the provisional financial plan based on the first financial information identified from the recording of the first conversation. The database 104 may have rules to define the preprogrammed financial plan algorithm that generates the provisional financial plan. In step 245, the system determines missing financial information not in the first financial information. For example, the server 102 may execute the preprogrammed financial algorithm to compare the first financial information with previous financial information stored in the database 104 for previous financial plans for other clients. Based on the comparison, the preprogrammed financial algorithm may identify the financial information missing in the first financial information. The missing financial information can be, for example, annual bonuses, checking accounts, investments in bonds, mutual funds and commodities.

In step 250, the system generates a first message comprising a request for the missing financial information and sends, with a transceiver of the first computing device, the first message over the communications network to the third computing device. In this step, the first message includes the request for the missing financial information for which information may be required from the client 142. In the example, the first message may include the request regarding annual bonuses, checking accounts, investments in bonds, mutual funds and commodities from the client 142. Next in step 255, the system receives a second message over the communications network from the third computing device, the second message comprising second financial information corresponding to the missing financial information. In this step, the client device 132 receives the first message from the server 102 and prompts the client 142 to provide the missing financial information. The prompt may be in form of a pop-up window displayed on an interface of the client device 132 and the pop-up window may display the missing financial information and the details required from the client 142. In response, the client 142 may provide the details regarding the missing financial information on the client device 132 and the client device 132 may send the information to the server 102. The server 102 then saves the details regarding the missing financial information in the database 104. In step 260, the system generates a financial plan based on the second financial information as the provisional financial plan.

Additionally, in one embodiment, a graphical interface displaying a graphical indication for each of the decisions made by the algorithm in order to generate the financial plan may be displayed on the second computing device of the financial advisor. In one embodiment, each of the graphical indications display it on the second computing device of the financial advisor may be configured such that the financial advisor to interact with in order to provide input related to each of these graphical indications. The system may be configured for receiving input from the financial advisor in order to edit each of the decisions made by the algorithm in order to generate the financial plan. In this way, the financial advisor using the second computing device may easily adjust the financial decisions made in order to create the financial plan so that the financial advisor, using the second computing device, may be able to easily adjust the decisions made to generate a new financial plan. This is an improvement over the prior art because previously, it would require financial advisors to conduct the laborious task of having to start the financial plan all over, which would be an increase in time energy and expense to the financial advisor.

Figure 2C:
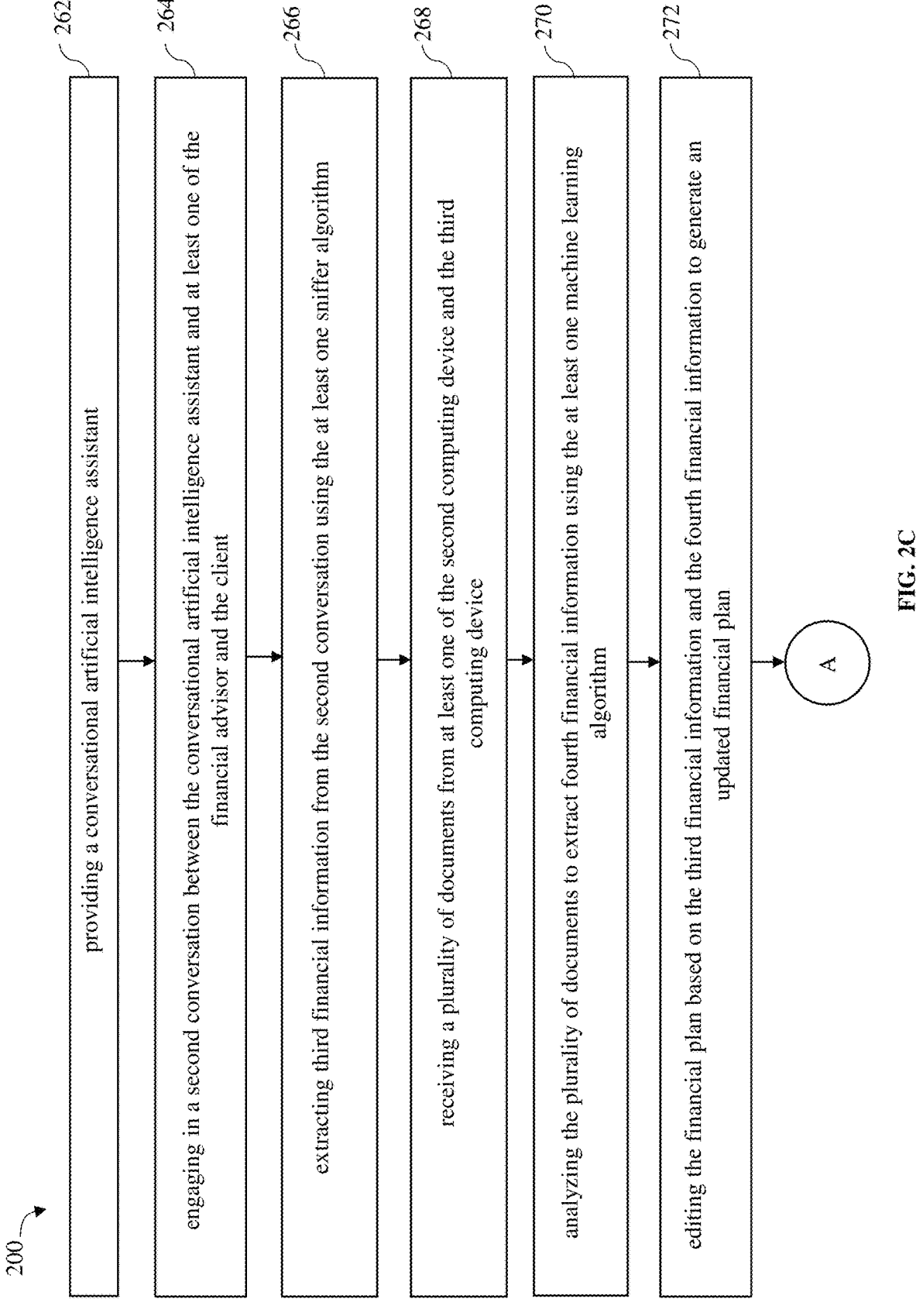
FIG. 2C is a flowchart showing the control flow of the process for methods and systems for editing the financial plan for generating an updated financial plan, according to an example embodiment.
Figure 2D:
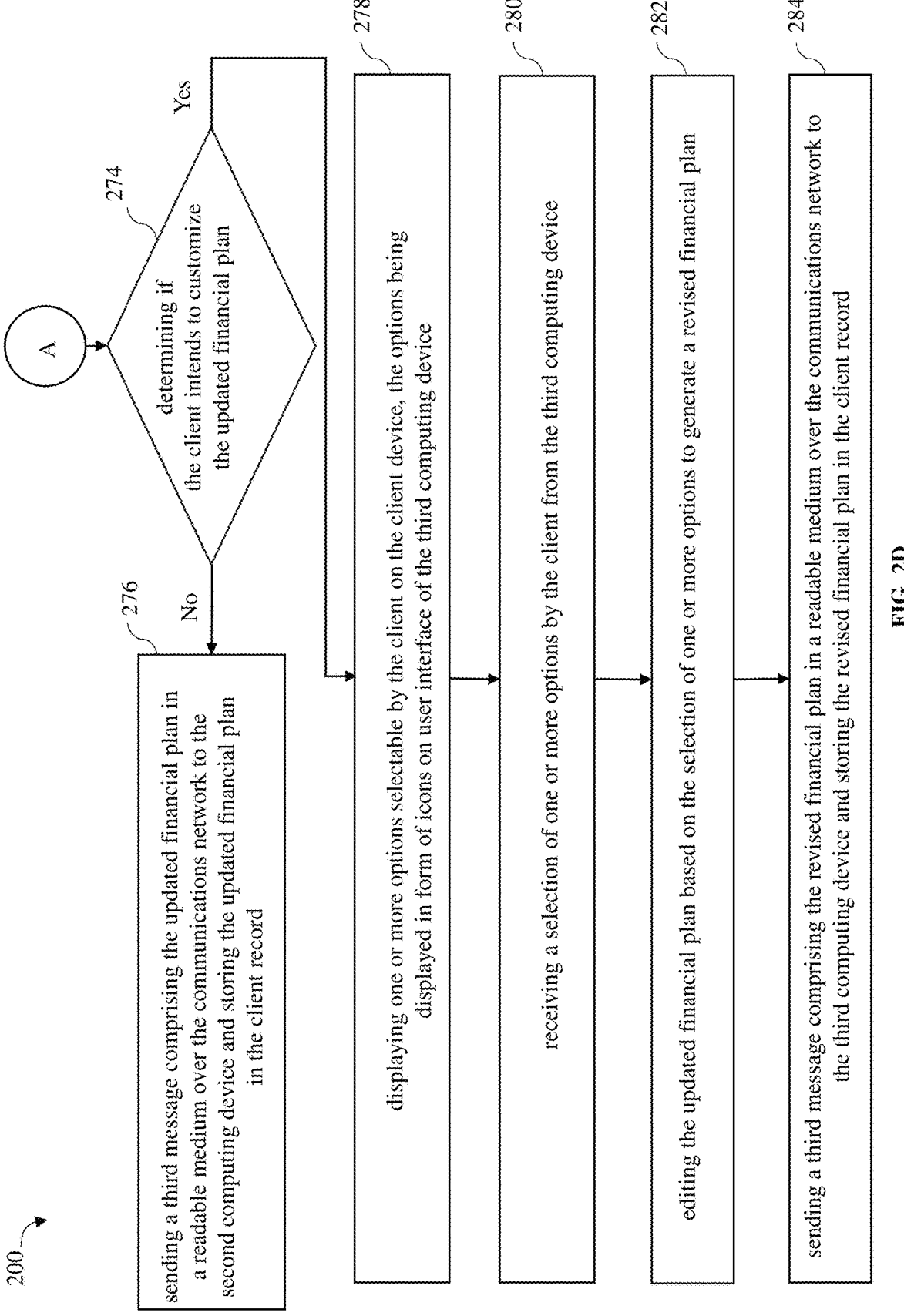
FIG. 2D is a flowchart showing the control flow of the process for methods and systems for editing the financial plan for generating an updated financial plan, according to an example embodiment.

FIG. 2C and FIG. 2D illustrate a flow chart for a method for editing the financial plan to generate an updated financial plan. In step 262, the system provides a conversational artificial intelligence assistant. For example, the conversational artificial intelligence assistant may be provided to the client device 132 or the advisor device 112. The conversational artificial intelligence assistant may be in a chat dialog box that opens on the User Interface (UI) or display of the advisor and client devices 112, 132. The conversational artificial intelligence assistant may engage the client 142 and the advisor 122 in a conversation and receive inputs from the client or the advisor regarding a third financial information. In an embodiment, the third financial information may be different from the first and second financial information. For example, the third financial information may include assets including cash, savings, retirement accounts, personal property, other investments, and liabilities including mortgage balance, credit cards. However, it is understood that other types of financial information may also be used for the third financial information and are within the scope of the present invention.

In step 264, the system engages in a second conversation between the conversational artificial intelligence assistant and at least one of the financial advisor and the client. In an embodiment, the server 102 engages the client 142 or the financial advisor 122, via the conversational artificial intelligence assistant, to provide information regarding a third financial information. The third financial information includes information regarding retirement planning and return on investments. In addition, the conversational artificial intelligence assistant displays a few questions about the financial plan on the UI of the client device 132. For example, a question displayed may be if the financial plan meets the personal financial goal of the client or if the client intends to reduce expenses or increase savings. The server 102 may display the question on the UI of the client device 132 along with icons that the client may select as an input. For example, the icons represent "reduce expenses", "increase savings", or "increase return on investment (ROI) ". The client 142 selects the icon representing reduce expenses and provides additional information regarding the current expenses and amount of expenses the client intends to reduce. The current expenses includes house rent, travel and meals bills, medical expenses of the client 142. In step 266, the third financial information is extracted from the second conversation using the sniffer algorithm.

Next in step 268, a plurality of documents is received from one of the second computing device and the third computing device. The client device 132 or the advisor device 112 may provide documents regarding a fourth financial information, such as insurance. The documents may include policy documents regarding health and medical insurance, car insurance, and house insurance. The system analyzes the plurality of documents to extract the fourth financial information using the machine learning algorithm in step 270. The server 102 executes the machine learning algorithm to extract the fourth information, such as annual premium, total sum insured, return of premium from the documents. In step 272, the financial plan is edited based on the third financial information and the fourth financial information to generate an updated financial plan. The server 102 receives the third and fourth financial information and provides the information to the preprogrammed financial plan algorithm to edit the financial plan. In an embodiment, the server 102 displays the updated financial plan on the advisor and client devices 112, 132. The server also displays graphical charts including pie-charts, bar graphs or line charts corresponding to the updated financial plan on the UI of the advisor and client devices 112, 132. In another embodiment, the graphical charts correspond to the assets, as shown in FIG. 3A, or liabilities of the client 142.

In step 274, the system determines if the client intends to customize the updated financial plan. In this step, the client device 132 displays a question on the UI of the device. The query may be for instance, if the client intends to customize the financial plan, and two icons of yes and no may also be displayed below the question. If the client 142 does not intend to customize the financial plan, the client 142 may provide a touch input by selecting the "No" tab. In step 276, the system sends a third message having the updated financial plan in a readable medium over the communications network to the second computing device and stores the updated financial plan in the client record. In an embodiment, the server 102 may send the third message having the updated financial plan to the third computing device such as the client device 132. In another embodiment, if the client 142 intends to customize the financial plan, the client may provide a touch input by selecting the "Yes" icon on the UI. In step 278, the system displays one or more options selectable by the client on the client device, the options being displayed in form of icons on user interface of the third computing device. The options may be related to various parameters that the client may intend to include or exclude from the financial plan. For example, if the client 142 intends to include a particular type of investment or exclude a particular type of insurance from the financial plan, then the user may select the type of investment to be included in the financial plan. The options are displayed in the form of icons on the UI such that the client 142 can select one option out of the displayed options. In step 280, a selection of one or more options by the client is received from the third computing device. The client 142 may select a particular type of investment such as a long-term investment from the options being displayed. The selected input is being received by the server 102. In step 282, the updated financial plan is edited based on the selection of one or more options to generate a revised financial plan. Thereafter, in step 284, a third message having the revised financial plan in a readable medium is sent over the communications network to the third computing device and the revised financial plan is stored in the client record. The server 102 then transmits the third message to the client device 132 in form of a readable document and stores the revised financial plan in the client record in the database 104. In an embodiment, the system modifies the graphical chart in real-time as per change in the updated financial plan and displays the modified graphical chart on the UI of the client device 132.

Figure 3A:
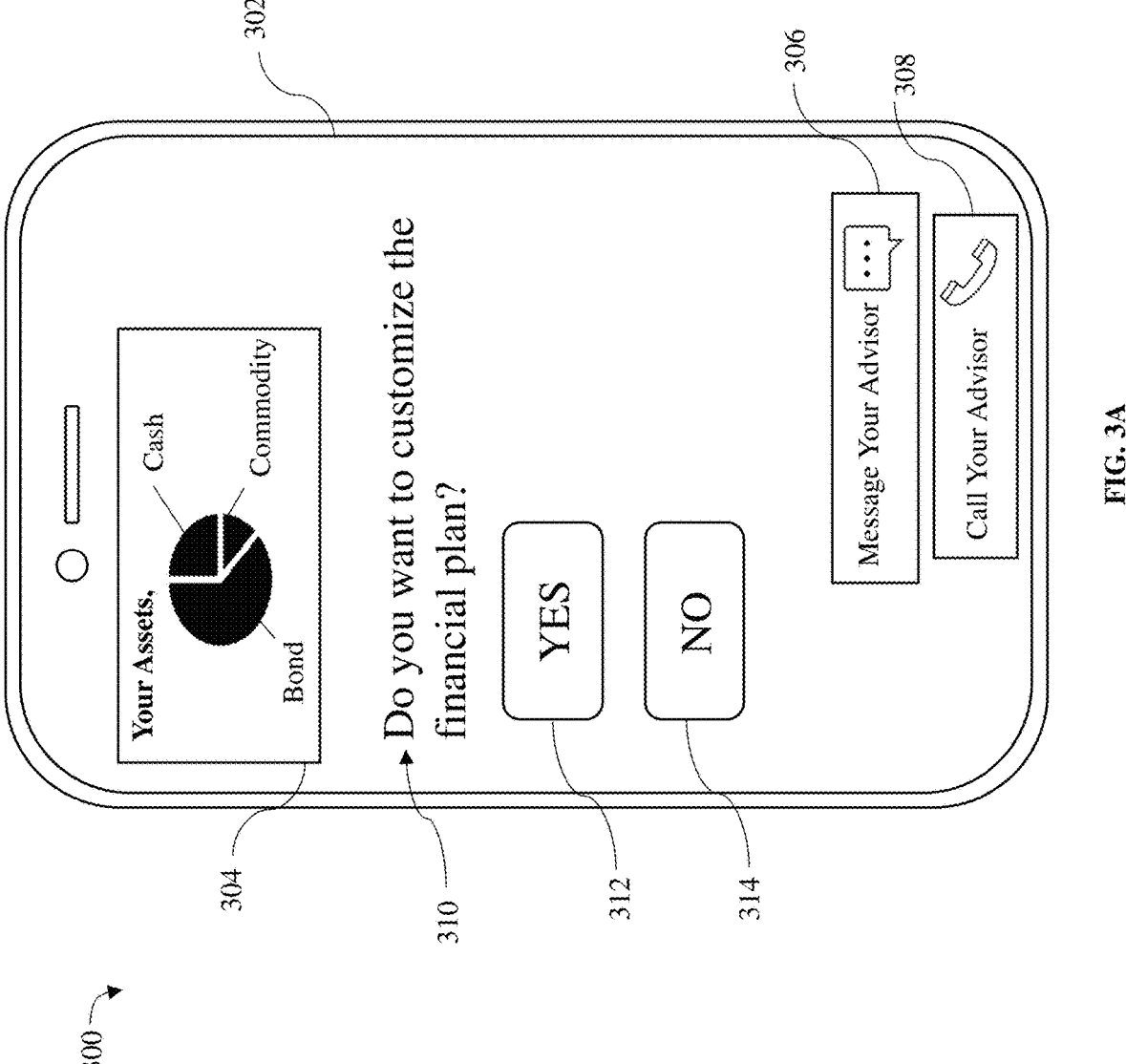
FIG. 3A is a graphic user interface for customizing a financial plan based on client response to questions displayed on a client device, according to a second example embodiment.
Figure 3B:
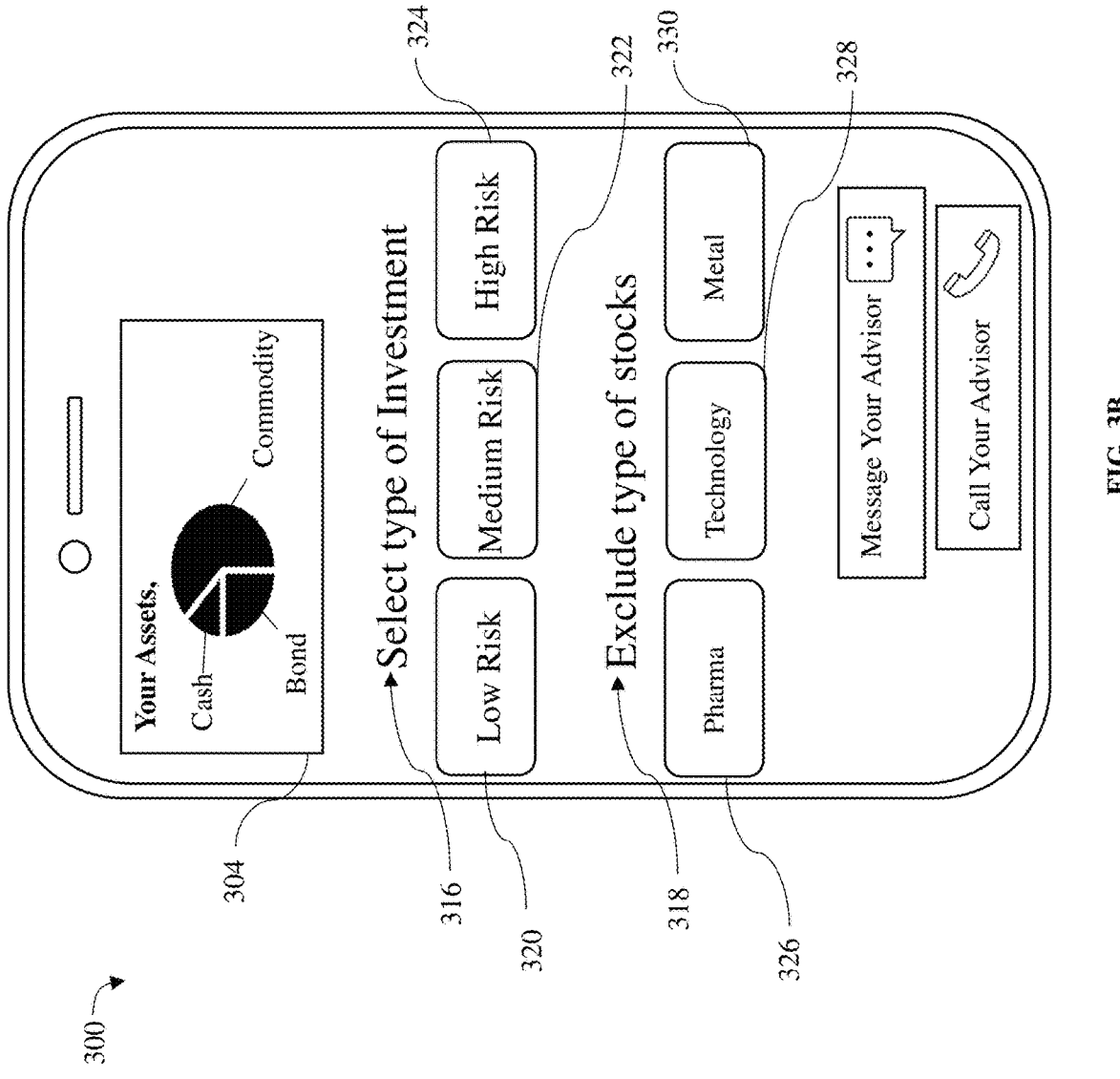
FIG. 3B is a graphic user interface for customizing a financial plan based on client response to questions displayed on a client device, according to a second example embodiment; and, FIG. 4 is a block diagram of a system including an example computing device and other computing devices, according to an example embodiment.

FIGS. 3A and 3B are examples of a graphical user interface displayed on a mobile device 300 for displaying icons corresponding to options provided to the client 142, according to an example embodiment. In an example embodiment, the mobile device 300 displaying the graphical user interface 302 is the client device 132. In another embodiment, the mobile device 300 displaying the graphical user interface 302 is the advisor device 112. The system is configured to provide, over the communications network, to each mobile device that is determined to be a client device of one or more clients participating in client onboarding for providing inputs to customize a financial plan. The graphical interface may be displayed on the mobile device 300, such as a cellular telephone, iPhone®, iPad®, tablet, smart phone or any other mobile device. The interface may include a graphical chart 304 displayed on a portion of the interface and graphical icons 306, 308, wherein each icon represents a mode of communicating with the advisor. A client may select an icon or other graphical representation on the display by interfacing with screen with a swipe or swiping gesture, push or other means of indicating a user preference. The graphic user interfaces may be configured for displaying information and receiving input from users and are well known to those skilled in the art. It is understood that the term "graphic user interface" and "graphical interface" may be used interchangeably throughout this application.

The icon 306 represents a messaging feature for the client to message the advisor, for example, the advisor 122, and the icon 308 represents a calling feature such that the client can call the advisor. The system also displays one or two queries for the client along with options in the form of icons on the interface when the client intends to customize the financial plan. For example, in operation, the system displays a query 310 if the client wants to customize the financial plan. The query 310 is displayed along with the options 312 representing a "Yes" icon and 314 representing a "No" tab, as shown in FIG. 3A. In the present embodiment the question is "Do you want to customize the financial plan?". However, other questions requiring a response may also be within the spirit and scope of the present invention. The system may require a response from the client device within a predetermined amount of time. The response may include the selecting of an option icon 312 to indicate that YES the client intends to customize the financial plan or to select icon 314 to indicate NO that the client does not intend to customize the financial plan. In an embodiment, when the client selects the icon 314, the system sends the updated financial plan in a readable medium over the communications network 106 to the client device 132. The client 142 may view and verify the details of the updated financial plan on the client device 132, 300. In an instance, when the client 142 has any query or comments regarding the updated financial plan, the client 142 may select the graphical icons 306, 308 to contact the advisor 122. The system stores the updated financial plan in the client record in the database 104.

In an embodiment, when the client 142 selects the option icon 312, then the client is provided with additional queries 316 and 318, as illustrated in FIG. 3B. The additional queries, for instance, can be related to the type of investment that the client intends to include and the type of stocks the client intends to exclude from a portfolio. However, it is understood that there may be additional queries and queries related to different financial information that is displayed in the graphical interface to receive inputs from the client may also be within the spirit and scope of the present invention. For the query 316, the client 142 may select one of icons 320, 322 and 324. In response to the query 318, the client 142 may select one of icons 326, 328, and 330 as input.

After receiving inputs from the client 142, the system edits the financial plan. In an example, the system utilizes the preprogrammed financial plan algorithm to edit the financial plan and generate a revised financial plan.

Figure 4:
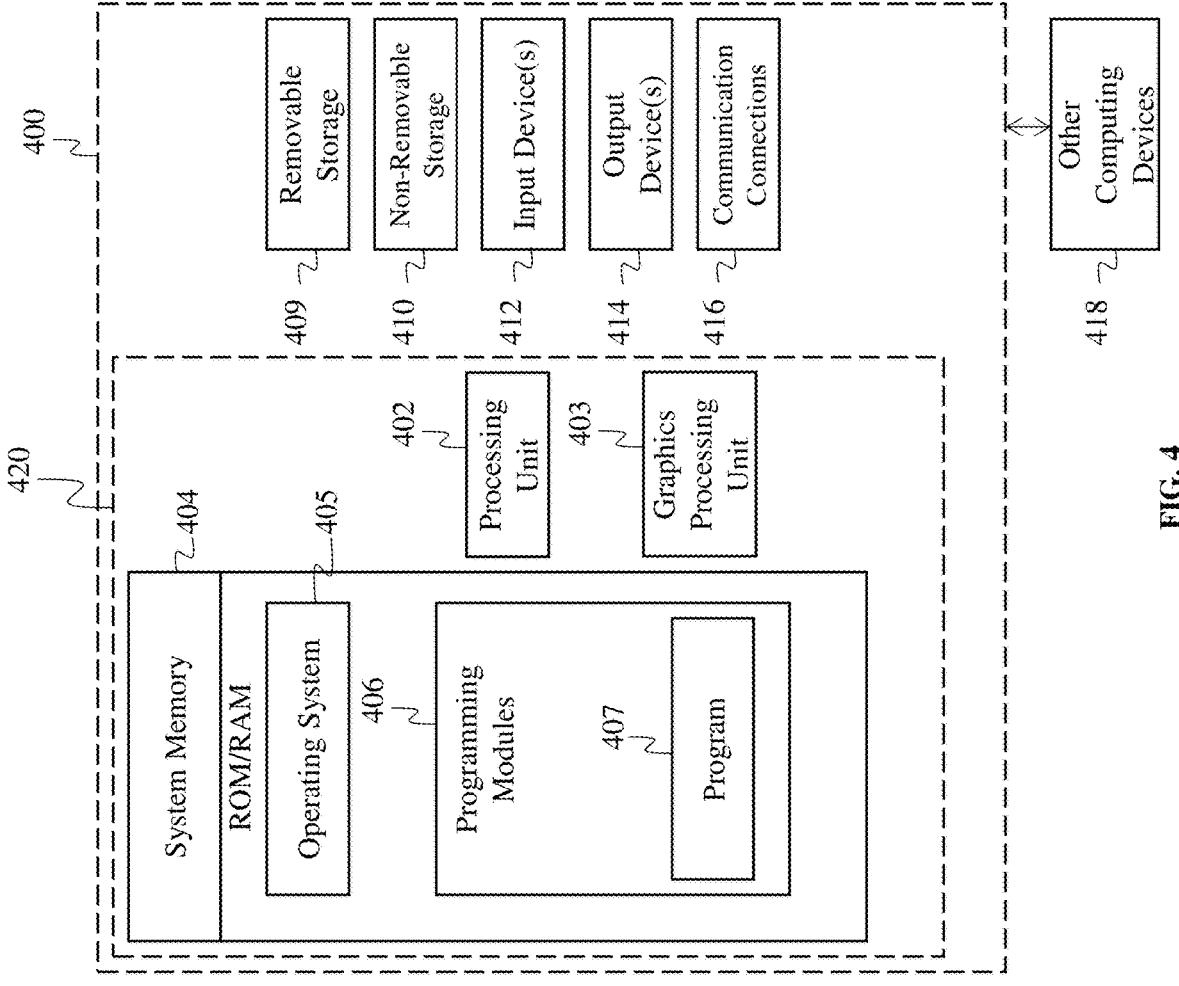

FIG. 4 is a block diagram of a system including an example computing device 400 and other computing devices. Consistent with the embodiments described herein, the aforementioned actions performed by devices 112, 132 and server 102 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise or be included in the operating environment 100, processes and for implementing graphical displays and interfaces 302 as described above.

With reference to FIG. 4, a system consistent with an embodiment of the invention may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g., random access memory (RAM)), non-volatile (e.g., read-only memory (ROM)), flash memory, or any combination or memory. System memory 404 may include operating system 405, and one or more programming modules 406. Operating system 405, for example, may be suitable for controlling computing device 400's operation. In one embodiment, programming modules 406 may include, for example, a program module 407 for executing the actions of server 102 and computing devices 112, 132, 300 for example. Furthermore, embodiments of the invention may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. The aforementioned devices are only examples, and other devices may be added or substituted.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 (e.g., program module 407) may perform processes including, for example, one or more of the stages of the processes 200 as described above. The aforementioned processes are examples, and processing unit 402 may perform other processes and may also be configured to provide user interfaces displayed in FIGS. 3A and 3B. Other programming modules that may be used in accordance with embodiments of the present invention may include electronic mail and contacts applications, word processing applications, spreadsheet applications, database applications, slide presentation applications, drawing or computer-aided application programs, etc. The graphic processing unit (GPU) 403 may include one or more electronic circuit designed to accelerate the processing of images and videos in a computer. It is commonly used to render graphics for video games, simulations, animations, and other visual tasks. Different types of GPUs include gaming GPUs optimized for rendering complex scenes in video games, professional GPUs designed for tasks like 3D modeling and CAD with certified drivers for accuracy, mobile GPUs prioritizing energy efficiency in smartphones and tablets, integrated GPUs conserving space and power by being part of CPUs and handling basic graphics tasks, data center GPUs optimized for AI and deep learning in data centers, cloud GPUs providing remote GPU resources through cloud platforms, AI accelerators with specialized hardware for accelerating tasks like matrix operations and neural networks, cryptocurrency mining GPUs tailored for efficient computation in cryptocurrency mining, embedded GPUs integrated into small devices like IoT systems and digital signs while maintaining compact size and energy efficiency, and consumer GPUs striking a balance between performance and affordability for everyday computing, light gaming, and multimedia consumption.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general-purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A computer implemented method using machine learning and artificial intelligence to generate a financial plan and streamline client onboarding comprising:

initiating, with a first computing device, an audio-visual communication channel over a communications network between a second computing device associated with a financial advisor and a third computing device associated with a client;

recording, using a microphone of the first computing device, a first conversation comprising at least audio data between the financial advisor and the client conducted via the audio-visual communication channel;

transcribing, by a processor of the first computing device, a recording of the first conversation to generate text data and storing the text data in a client record of a customer relationship management system;

querying a connected database comprising a customer relationship management system for storing a plurality of client records;

identifying first financial information from at least one of the recording of the first conversation and the transcribed text data using at least one machine learning algorithm comprising at least one sniffer algorithm; wherein the at least one sniffer algorithm comprises at least one of (i) natural language processing algorithms, (ii) pattern recognition algorithms, and (iii) data classification algorithms to analyze data, extract, and capture predetermined relevant financial information;

extracting the first financial information based on the at least one sniffer algorithm;

querying in the connected database, a preprogrammed financial plan algorithm for generating a provisional financial plan based on the first financial information identified from the recording of the first conversation;

determining missing financial information not in the financial information based on preprogrammed financial plan algorithm;

generating a first message comprising a request for the missing financial information and sending, with a transceiver of the first computing device, the first message over the communications network to the third computing device, wherein the third computing device, responsive to the first message, displays on a graphical user interface selectable prompts in the form of icons corresponding to the missing financial information;

receiving a second message over the communications network from the third computing device, the second message comprising second financial information corresponding the missing financial information;

generating a financial plan based on the second financial information as the provisional financial plan;

providing a conversational artificial intelligence assistant for engaging in at least one of (i) text based communications, and (ii) audio based communications with at least one of the financial advisor and the client;

engaging in a second conversation between the conversational artificial intelligence assistant and at least one of the financial advisor and the client;

extracting third financial information from the second conversation using the at least one sniffer algorithm;

receiving a plurality of documents from at least one of the second computing device and the third computing device;

analyzing the plurality of documents to extract fourth financial information using the at least one machine learning algorithm; and editing the financial plan based on the third financial information and the fourth financial information to generate an updated financial plan.

2. The computer implemented method of claim 1, wherein the recording of the first conversation is transcribed, with a processor of the first computing device, to generate transcribed text data.

3. The computer implemented method of claim 1 further comprising:

determining, by the first computing device, if the client intends to customize the updated financial plan;

displaying one or more options selectable by the client on the client device, the options being displayed in form of icons on user interface of the third computing device;

receiving a selection of one or more options by the client from the third computing device;

editing the updated financial plan based on the selection of one or more options to generate a revised financial plan; and sending a third message comprising the revised financial plan in a readable medium over the communications network to the third computing device and storing the revised financial plan in the client record.

4. The computer implemented method of claim 2, wherein the transcribed text data is stored into a client record of the plurality of client records of the customer relationship management system.

5. The computer implemented method of claim 1, further comprising sending a third message comprising the updated financial plan in a readable medium over the communications network to the second computing device and storing the updated financial plan in the client record.

6. A system, over a communications network, for using machine learning and artificial intelligence to generate a financial plan and streamline onboarding of a client, comprising:

a connected database comprising a customer relationship management system for storing a plurality of client records;

a memory;

a network interface device communicatively coupled with the communications network; and, a processor configured for:

initiating, with a first computing device, an audio-visual communication channel over the communications network between a second computing device associated with a financial advisor and a third computing device associated with the client;

recording a first conversation comprising at least audio data between the financial advisor and the client conducted via the audio-visual communication channel;

transcribing a recording of the first conversation to generate text data and storing the text data in a client record of a customer relationship management system;

querying the connected database;

identifying first financial information from at least one of the recording of the first conversation and the transcribed text data using at least one machine learning algorithm comprising at least one sniffer algorithm; wherein the at least one sniffer algorithm comprises at least one of (i) natural language processing algorithms, (ii) pattern recognition algorithms, and (iii) data classification algorithms to analyze data, extract, and capture predetermined relevant financial information;

extracting the first financial information based on the at least one sniffer algorithm;

querying in the connected database, a preprogrammed financial plan algorithm for generating a provisional financial plan based on the first financial information identified from the recording of the first conversation;

determining missing financial information not in the financial information based on preprogrammed financial plan algorithm;

generating a first message comprising a request for the missing financial information and causing a transceiver of the first computing device to send the first message over the communications network to the third computing device, wherein the third computing device, responsive to the first message, displays on a graphical user interface selectable prompts in the form of icons corresponding to the missing financial information;

causing the transceiver to receive a second message over the communications network from the third computing device, the second message comprising second financial information corresponding the missing financial information;

generating a financial plan based on the second financial information as the provisional financial plan;

providing a conversational artificial intelligence assistant for engaging in at least one of (i) text based communications, and (ii) audio based communications with at least one of the financial advisor and the client;

engaging in a second conversation between the conversational artificial intelligence assistant and at least one of the financial advisor and the client;

extracting third financial information from the second conversation using the at least one sniffer algorithm;

causing the transceiver to receive a plurality of documents from at least one of the second computing device and the third computing device;

analyzing the plurality of documents to extract fourth financial information using the at least one machine learning algorithm; and editing the financial plan based on the third financial information and the fourth financial information to generate an updated financial plan.

7. The system of claim 6, wherein the processor is configured for transcribing a recording of the first conversation to generate transcribed text data.

8. The system of claim 7, wherein the processor is further configured for:

determining, by the first computing device, the client intends to customize the updated financial plan;

displaying one or more options selectable by the client on the client device, the options being displayed in form of icons on user interface of the third computing device;

receiving a selection of one or more options by the client from the third computing device;

editing the updated financial plan based on the selection of one or more options to generate a revised financial plan; and sending a third message comprising the revised financial plan in a readable medium over the communications network to the third computing device and storing the revised financial plan in the client record.

9. The system of claim 7, wherein the transcribed text data is stored into a client record of the plurality of client records of the customer relationship management system.

10. The system of claim 7, wherein the processor is further configured for sending a third message comprising the updated financial plan in a readable medium over the communications network to the second computing device and storing the updated financial plan in the client record.

* * * * *